United States Patent [19]

Davies

[11] 3,771,434

[45] Nov. 13, 1973

[54] MILK STERILIZING APPARATUS

[75] Inventor: Elmer S. Davies, Takoma Park, Md.

[73] Assignee: Dasi Industries Inc., Washington, D.C.

[22] Filed: July 3, 1972

[21] Appl. No.: 268,873

[52] U.S. Cl. .................................... 99/454, 99/212
[51] Int. Cl. ............................................. A23c 3/02
[58] Field of Search ..................... 99/453, 454, 216, 99/215, 452, 455, 456, 472, 473

[56] References Cited
UNITED STATES PATENTS

| | | | |
|---|---|---|---|
| 1,984,956 | 12/1934 | Anglim | 99/453 |
| 2,909,985 | 10/1959 | Abrams | 99/453 |
| 3,032,423 | 5/1962 | Evans | 99/215 |
| 3,230,095 | 1/1966 | Stewart | 99/454 |

Primary Examiner—Robert W. Jenkins
Attorney—Harvey B. Jacobson et al.

[57] ABSTRACT

A sterilizing apparatus for fluent materials, particularly milk, for raising the temperature of the material to a sterilizing temperature in a very short period of time and then discharging the material for substantially instantaneous cooling to enable the sterilization to occur without adverse affect on the natural flavor and stability of the milk or other material. The sterilizing apparatus includes a pressure vessel communicated with a steam source and also includes a milk inlet pipe which introduces milk into the vessel through insulated distribution pipes for equal volume inlet through a plurality of horizontally disposed slot-like openings so that the milk will be discharged into the vessel in the form of a plurality of thin films. A depending screen may be provided in each of the slot-like openings so that milk will be discharged along the surface of the screen to form a thin film and assure that each particle of milk is identically heated to ensure complete sterilization. The bottom of the pressure vessel is coated with an inert plastic material to prevent any buildup of milk on such surfaces. The bottom of the pressure vessel is communicated with a source of vacuum through a liquid seal and a holding tube with the holding time and length being factors so that the sterilized milk will be instantaneously cooled from its sterilizing temperature. The stream which is introduced into the pressure vessel is absorbed into the milk as it is heated and the steam that was added to the milk during the heating and sterilization process will be removed therefrom during the cooling process.

14 Claims, 6 Drawing Figures

United States Patent [19]
Davies
[11] 3,771,434
[45] Nov. 13, 1973
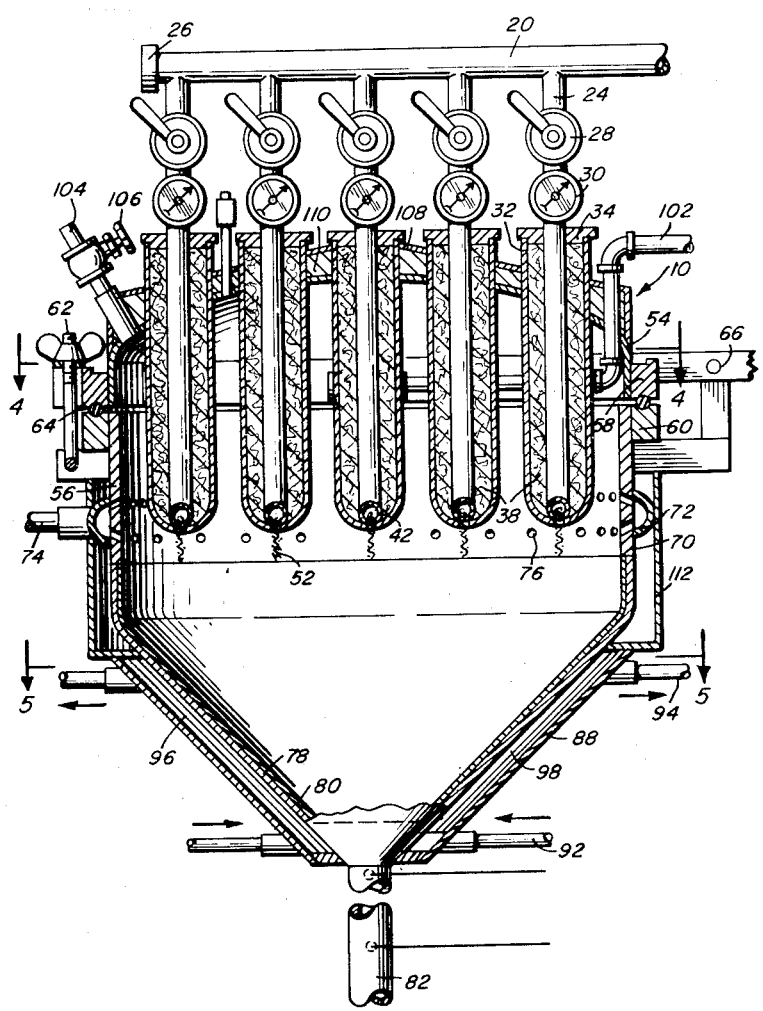

MILK STERILIZING APPARATUS

BACKGROUND OF THE INVENTION

1. Field of the Invention

The present invention generally relates to a milk sterilizing apparatus and more particularly, such an apparatus which will effectively heat the milk to a sterilizing temperature in a very short time without disturbing its natural flavor and stability and subsequently instantaneously cooling the sterilized milk from it sterilizing temperature with the entire sterilizing process requiring a very short elapsed time.

2. Description of the Prior Art

My prior U. S. Pat. No. 2,899,320, issued Aug. 11, 1959 discloses a process for the sterilization of milk in which preheated milk is introduced into a sterilizer where it is raised to a sterilization temperature and then discharged into a vacuum chamber for cooling. The apparatus schematically disclosed in this patent has been subsequently improved to provide a more effective sterilization of the milk. Prior U. S. Pat. No. 3,032,423 discloses an apparatus for forming a thin film of milk within a pressure vessel for sterilization thereof but fails to provide an adequate structure and necessary control for the incoming milk and the discharged milk which is instantaneously cooled. Prior U. S. Pat. No. 1,819,023, issued Aug. 18, 1931 also discloses a process and apparatus for thermal sterilization of milk. This patent employs a violent agitation or turbulence of the milk particles which has been found to result in adverse affects upon the sterilized milk product.

Prior U. S. Pat. No. 2,115,472, issued Apr. 26, 1938 discloses a milk sterilizing apparatus which also attempts to quickly heat the milk and then rapidly cool the milk. Also, in this patent, the steam is introduced into the milk by a jet action which creates a high degree of agitation or turbulence in the milk which has been found to result in adverse affects upon the sterilized milk product.

Prior U. S. Pat. No. 2,049,591 discloses a process of sterilizing milk by heating the milk to a sterilizing temperature and then introducing the milk into sterilized containers where it is held at an elevated temperature for a period of time. This patent fails to disclose any particular apparatus for carrying out the process disclosed.

While the prior art discloses the basic process of sterilizing milk by rapidly heating it to a sterilizing temperature and then rapidly cooling it and includes apparatuses for accomplishing this function, such devices have not been successfully utilized on a commercial basis due probably to deficiencies in the quality of th sterilized milk product and probably due to inefficiencies in operation of the apparatus.

SUMMARY OF THE INVENTION

An object of the present invention is to provide a mill sterilizing apparatus in which milk, under pressure, can be raised to a sterilizing temperature within a very short time and discharged for substantially instantaneous cooling in order to sterilize the milk without disturbing its natural flavor and stability with the apparatus controlling the passage of milk through the sterilizer so that no particle of the milk comes in contact with any surface that is substantially hotter than the milk itself with the milk being discharged into the apparatus in a plurality of downwardly directed thin films separated from each other and being subject, during its downward travel, to direct contact with steam that is at a sufficient temperature and pressure to raise each and every particle of the milk to the sterilizing temperature with the steam and milk being combined during the heat exchange process.

A further object of the invention is to provide a milk sterilizing apparatus in which the pressure vessel into which the milk is discharged and into which the steam is discharged is provided with a liquid seal in the bottom thereof so that the liquid effluent is discharged into a vacuum container where the effluent is quickly reduced in temperature which result in substantially instantaneous cooling of the milk and separation of water therefrom with very little, if any, denaturation of the milk thereby preventing any "off" taste in the sterilized milk product.

Still another object of the invention is to provide a milk sterilizing apparatus which effectively controls the time-temperature relationship from the time the milk enters the pressure vessel or sterlizing chamber until it passes into the vacuum chamber or container in an efficient manner with the structure being relatively simple, easy to install and maintain in a sterile condition and yet relatively inexpensive to operate and to maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
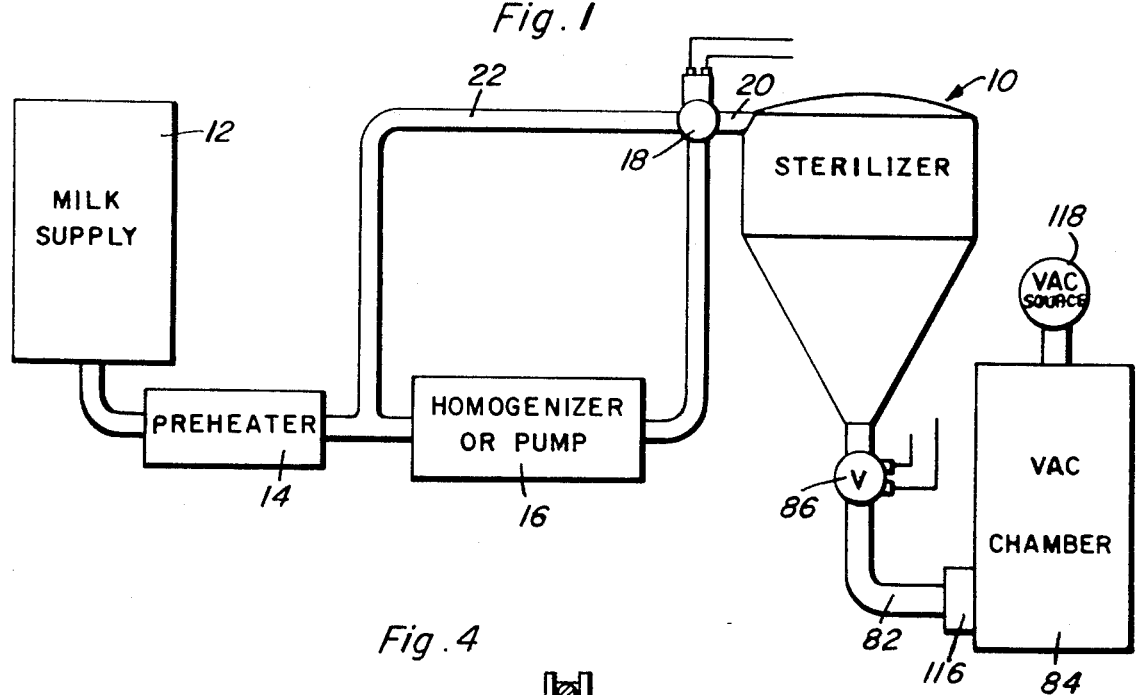
FIG. 1 is a schematic view of the system incorporating the milk sterilizing apparatus of the present invention therein.
Figure 4:
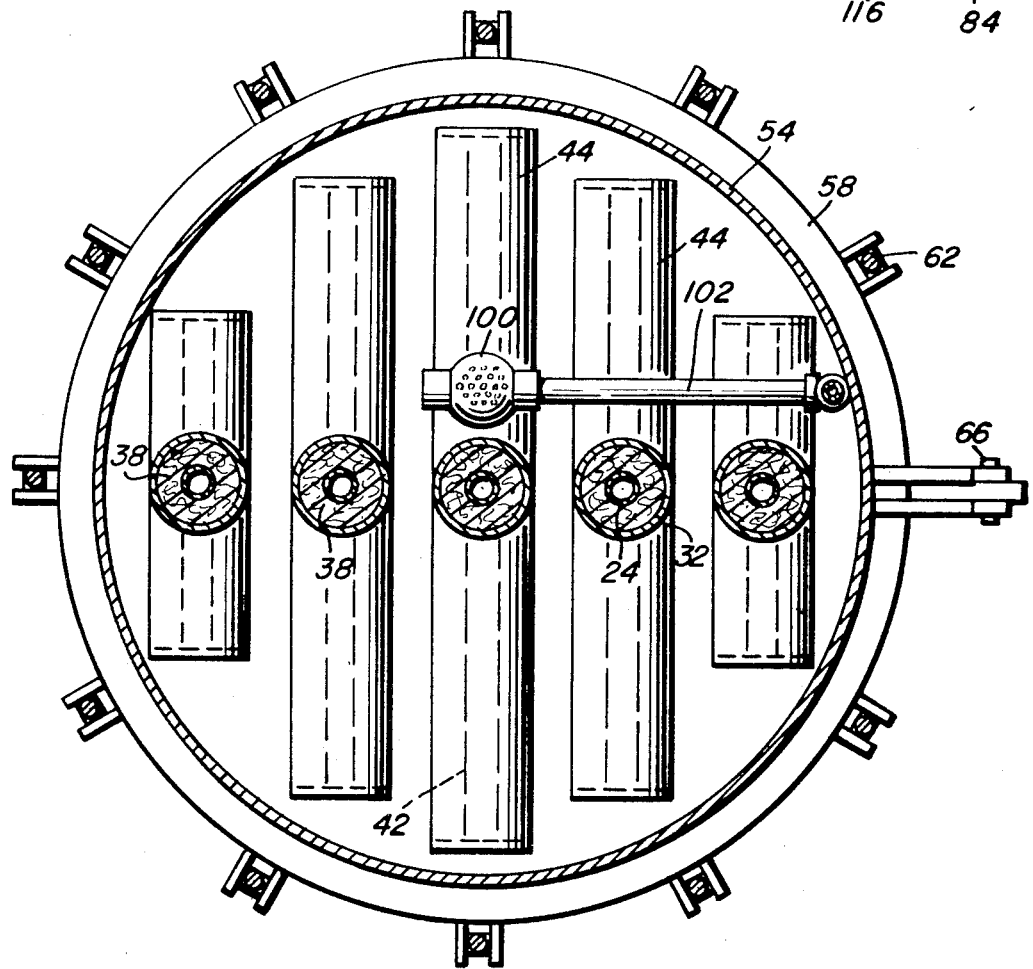
FIG. 4 is a plan sectional view taken substantially upon a plane passing along section line 4—4 of FIG. 3 illustrating further structural details of the sterilizing apparatus.

The milk sterilizing apparatus of the present invention is generally designated by reference numeral 10 and is schematically illustrated in a milk sterilizing system in FIG. 1 which includes a milk supply 12 and a preheater 14 to preheat the milk to approximately 155°F. which will prevent whey protein denaturation. From the preheater, the milk is passed through a homogenizer 16 or pump and through a diversion valve 18 which communicates with the milk inlet pipe 20 of the sterilizing apparatus and a diversion line 22 which extends back to the inlet of the homogenizer or pump 16. As the milk passes through the homogenizer, it is increased in temperature by approximately 5°F. due to the pressure in the homogenizer so that milk entering the milk sterilizing apparatus 10 will be at approximately 160°F.

The milk inlet pipe 20 is in the form of a manifold having a plurality of downwardly extending pipes 24 communicated therewith. The terminal end of the inlet pipe 20 is provided with a closure cap 26 with the endmost downwardly extending pipe 24 being disposed closely adjacent the end cap. Each of the downwardly extending pipes 24 is provided with a regulating valve 28 and a pressure gauge 30. The lower part of each inlet pipe 24 extends downwardly into a cylindrical jacket 32 having an upper closure cap 34 thereon with the pipe 24 being spaced from the jacket 32 and insulated therefrom by an insulating material 38.

The lower end of the inlet pipe 24 is communicated with a transversely extending milk discharge pipe 24 that is enclosed by a horizontally disposed tubular member 44 which encircles the pipe 42 in eccentric relation thereto with the space between the tubular member 44 and the discharge pipe 42 being filled with insulation 46. The lower periphery of the discharge pipe 42 is provided with a relatively narrow slot 48 extending throughout the length thereof for discharging milk in a thin film through a wider slot 50 in the tubular member 44. To further facilitate maintaining the milk discharge in a thin film, a screen panel 52 is supported from the tubular member 44 in alignment with the slot 50 and the slot 48 so that the milk discharged will be discharged along the surfaces of the screen to maintain the thin film characteristics thereof.

Figure 2:
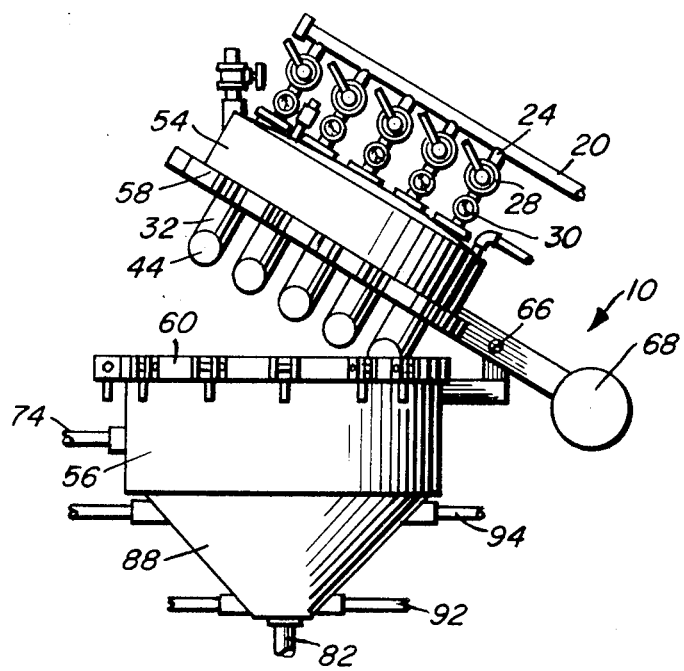
FIG. 2 is a side elevational view of the sterilizing apparatus illustrating the device in open condition.
Figure 3:
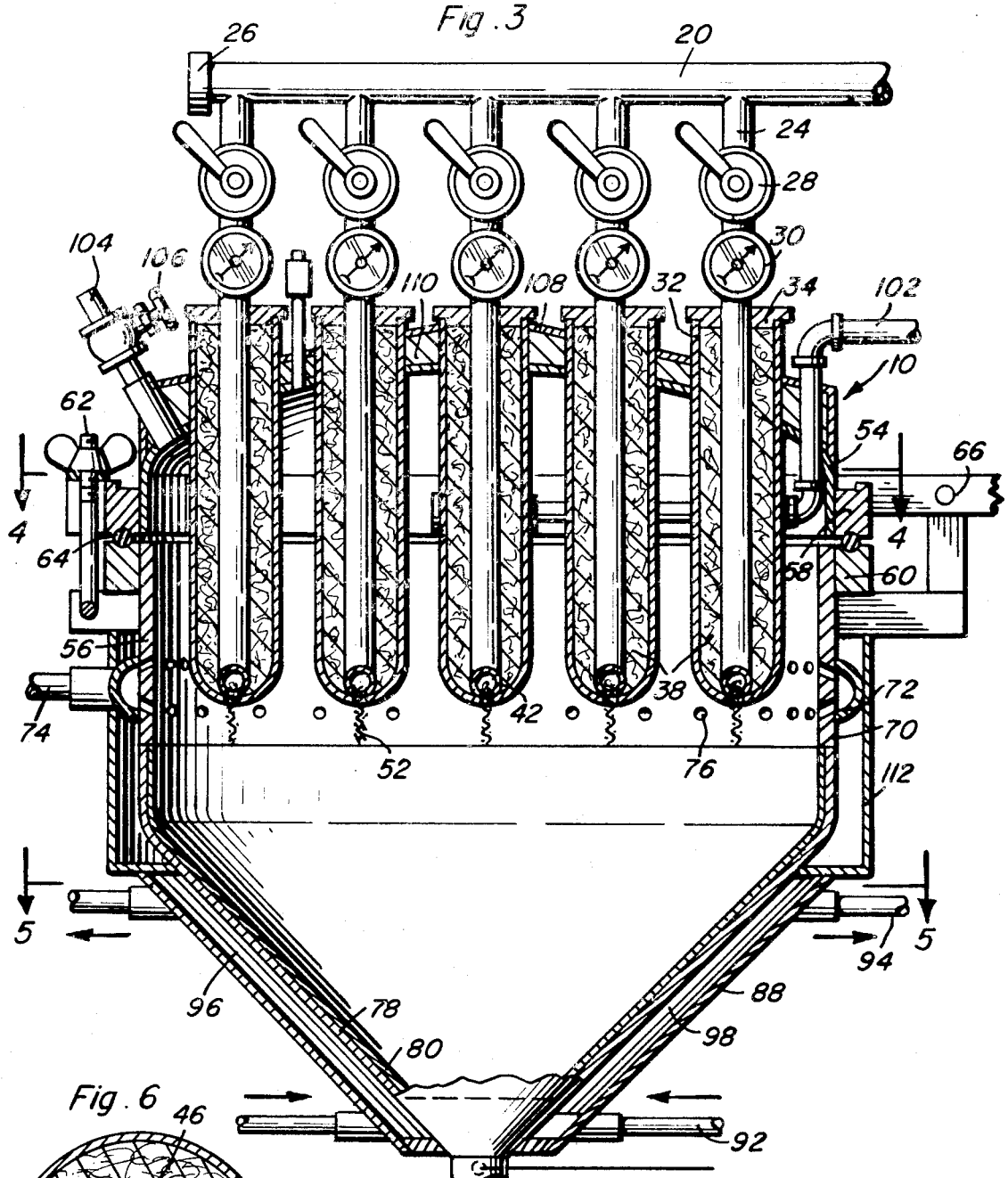
FIG. 3 is a vertical sectional view of the sterilizing apparatus, on an enlarged scale, illustrating the specific structural details thereof.
Figure 6:
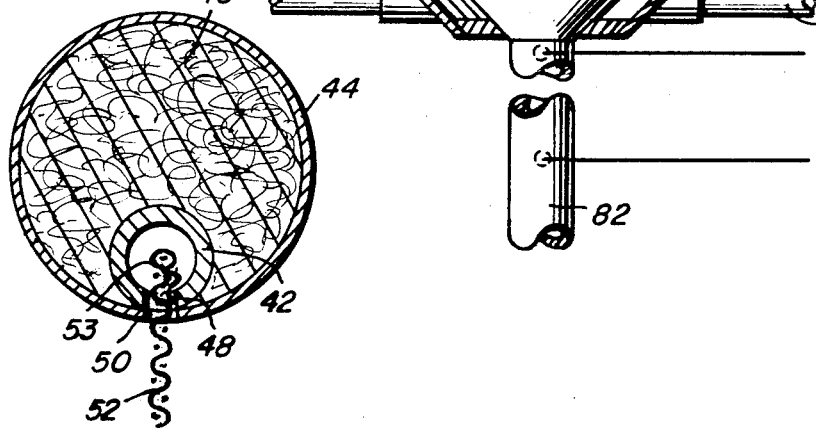
FIG. 6 is a detailed sectional view of one of the discharge pipes for the milk illustrating the slot-like construction and screen to provide a thin milk film.

All of the aforementioned components are mounted on the upper half or lid portion 54 of a sterilization chamber or pressure vessel 56 which may by cylindrical in construction and provided with reinforcing rings 58 and 60 at the lower edge of the lid or dome 54 and the upper edge of the vessel 56 as illustrated in FIG. 3. The reinforcing rings 58 and 60 are releasably secured together by suitable fastening devices 62 and a seal 64 of any suitable type is provided for sealing the lid or dome 54 and the vessel 56 when in closed condition. A suitable hinge structure 66 is provided for supporting the lid from the vessel and a counterweight 68 may be provided for counterbalancing the lid weight to facilitate cleaning of the apparatus by maintaining the lid or dome in an open condition as illustrated in FIG. 2.

The vessel 56 includes an inner cylindrical wall 70 surrounded by a manifold 72 communicated with a steam inlet pipe 74. A plurality of apertures 76 communicates the manifold 72 with the interior of the vessel 56. The lower end of the wall 70 is provided with a conical member 78 in the form of a collection chamber which is coated with a coating of inert plastic material 80 such as "Teflon" or any other similar material. The lower end of the conical shaped collection chamber or member 78 is communicated with a discharge pipe 82 which is in communication with a vacuum chamber 84. The discharge line 82 is provided with a liquid level control valve assembly 86 that controls the diverter valve 18 in a manner to conform the discharge volume with the intake volume to maintain a constant flow through the sterilizer and prevent variable flow rate that could result in retention of an excessive volume of milk in the sterilizer beyond the desired time-temperature conditions. Steam is introduced into the pressure vessel at 310°F. and 64 psig with the steam being diffused and coming into intimate contact with the milk films to evenly heat all particles of milk to the same temperature with the steam being absorbed by the milk and the desired temperature being 300°F. with the liquid seal, formed by the control valve apparatus 86, retaining this temperature for 0.5 second with the heated milk taking 1 second to pass through the pipe to the vacuum chamber where the temperature drops to 160°F. instantaneously.

Figure 5:
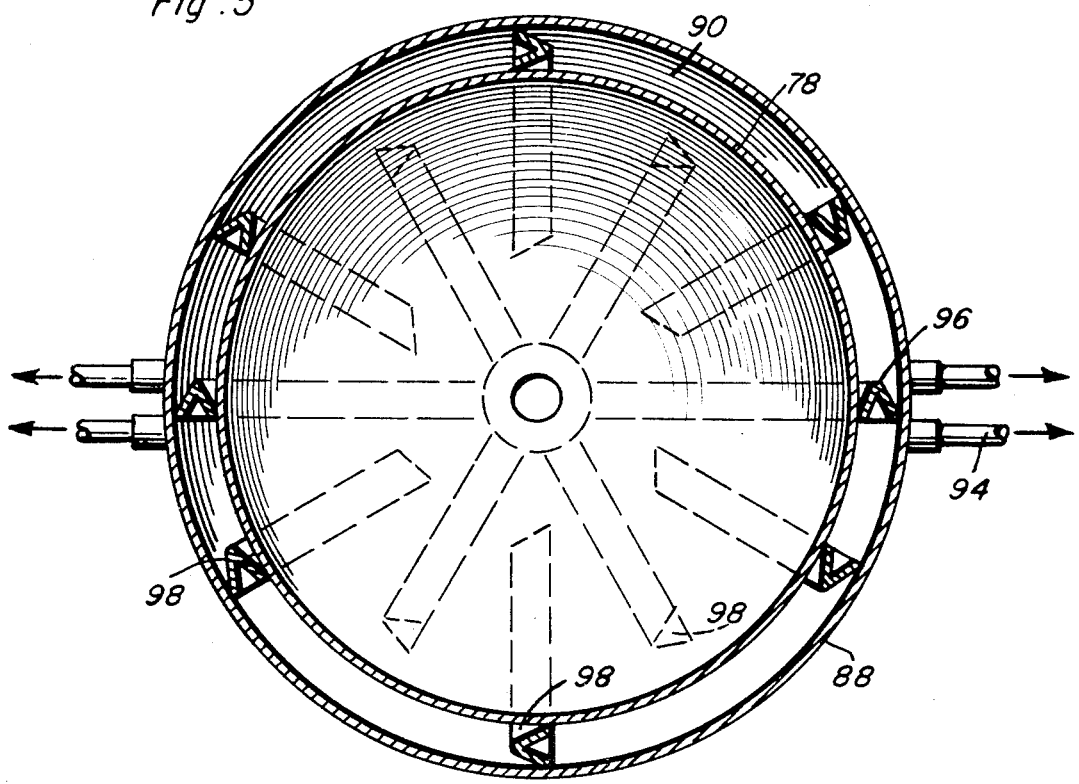
FIG. 5 is a transverse, plan sectional view taken substantially upon a plane passing along section line 5—5 of FIG. 3 illustrating further structural details of the pressure vessel.

The lower conical portion of the pressure vessel 56 is provided with a conical jacket 88 which is spaced from and generally parallel to the conical member 78 and which defines a conical annular space 90 therebetween for flow of a coolant such as water or air with the coolant entering the bottom of the jacket 88 through inlet lines 92 and exiting from the jacket at the upper end thereof by discharge lines or conduits 94. As illustrated in FIG. 5, the jacket 90 is divided into two diametric areas by baffles 96 which are diametrically opposed and which extend from the top to the bottom of the jacket for separating the jacket into two halves each of which is provided with an inlet conduit 92 and an outlet conduit 94. Each half of the jacket 90 is provided with a plurality of baffles 98 alternate of which extend from the top of the chamber down to a point spaced above the bottom of the chamber with the adjacent baffle extending from the bottom of the chamber up to a point spaced below the top of the chamber thereby defining a tortuous or zigzag path of flow for the coolant. Temperature responsive control devices are provided for controlling the coolant flow through the cooling jacket 90 for maintaining the temperature of the conical member 78 at a predetermined temperature level to avoid the possibility of the temperature of the conical member 78 becoming hotter than the milk which could result in the milk sticking onto or coating the inner surface thereof.

The dome 54 is provided with a cleaner spray head 100 communicated with a supply pipe or conduit 102 which is connected with a suitable pressurized supply for a cleaning solution so that the interior of the sterilizer may be cleaned without opening the device. The cleaning solution, of course, is directed to a collecting tank or recirculated by the use of a detachable hose connection or other detachable pipe connection or valved T-connection at the lower discharge end of the sterilizer. When a more thorough cleaning may be desired, the dome 54 may be opened and cleaned using accepted cleaning procedures. Also, the dome 54 has a discharge pipe 104 provided with a valve 106 therein which may be employed to purge air from the interior of the sterilizer when commencing operation thereof after cleaning. Also, the dome is provided with a covering surface 108 defining a jacket for insulation 110 to serve to restrict the loss of heat from the sterilizer. A similar jacket 112 is provided for the pressure vessel 66 which encloses the manifold 72 and defines the upper end of the cooling jacket 90 as illustrated in FIG. 3.

Th screen 52 may be supported in relation to the discharge pipe 42 by having the upper edge thereof reversely folded at 53 so that it will be retained in position but still enable discharge of milk through the slots along the screen surface. At least one end of the slots will be open sufficiently to enable the screen to be slid inwardly with the reverse bend 53 disposed interiorly of the discharge pipe 42 with the open end of the slots being effectively closed by the end portion of the screen.

In cleaning the interior of the inlet pipes and associated structure, a cleaning solution conduit is connected to the inlet pipe 20 in any suitable manner so that the cleaning solution will be used not only to clean the interior surfaces of the inlet pipes but also the exterior surfaces of the sterilizer which are exposed to milk during the sterilization process.

In actual practice, the temperature of the steam within the sterilizer is maintained at 310°F. and 64 psig. The coolant flow is controlled to maintain temperature of the conical member 78 at 300°F. This temperature may be controlled by suitable sensing devices associated with the coolant outlet and inlet and suitable control valves to maintain the temperature of the conical member 78 at the desired level. The temperature and pressure conditions are maintained through the liquid seal at the lower end of the chamber 78 and the discharge pipe 82 until the effluent reaches a temperature-pressure valve 116 that discharges directly into the bottom of the vacuum chamber 84 which has the upper end thereof communicated with a vacuum source 118 with the vacuum source maintaining the vacuum chamber under predetermined vacuum conditions. As the effluent is discharged through the temperature and pressure regulating valve 116 into the vacuum chamber 84, it is instantaneously lowered in temperature and pressure to 160°F. and 28½ inches Hg. which not only instantaneously lowers the temperature but also separates water from the milk. The control valve 86 may be of the diaphragm type and is controlled to assure a liquid seal in the bottom of the chamber 78 with temperature snesors in this area of the sterilizer also serving to control the diversion valve 18 and temperature sensors in the inlet line 20 also serving to control the diversion valve 18 to assure that the milk entering the sterilizer will be at 160°F. and that the volume of milk entering the sterilizer will be controlled so that the inlet volume will be maintained so that the milk will be raised to 300°F. in the sterilizer.

As an alternative arrangement, a strip of plastic material, such as "Teflon" provided with spaced spherical balls along the top edge may be used in the slot in lieu of the screen 52 with the strip being approximately 2 inches in width with the thcikness being sufficiently less than the width of the slot to provide an effective slot width of 0.010 inch.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sterilizing apparatus for milk and the like comprising a pressure vessel, a milk inlet pipe communicated with the upper portion of the vessel, at least one horizontally disposed milk discharge pipe disposed interiorly of the vessel above the bottom thereof and in communication with the inlet pipe, said discharge pipe including a longitudinally extending, relatively narrow slot in the bottom portion thereof for discharging milk in the form of a thin film, steam inlet means communicating with the interior of the pressure vessel for discharging steam into the interior thereof at a predetermined temperature and pressure for heat exchange association and absorption by the thin film of milk for rapidly heating all particles of the thin film of milk to sterilizing temperature without substantial agitation of the milk, and discharge conduit means including a liquid seal at the bottom of the vessel for discharge of the effluent to a vacuum chamber for instantaneous cooling of the sterilized milk from the sterilizing temperature.

2. The structure as defined in claim 1 wherein said steam inlet means includes a manifold encircling the vessel and a plurality of circumferentially spaced inlet openings in the vessel communicating the manifold with the interior of the vessel to introduce the steam into the vessel through a relatively large area to maintain the velocity of the incoming steam at a minimum to reduce turbulence and agitation.

3. The structure as defiend in claim 1 wherein said dicharge conduit means includes a liquid level control, said milk inlet pipe incuding control means associated therewith operative in response to the liquid level control to control the flow rate of milk so that a substantially constant volume of milk flows through the pre-sure vessel.

4. The structure as defined in claim 1 wherein the bottom portion of the vessel is in the form of a conical member having a sloping surface toward the center with the discharge conduit means being communicated with the bottom center of the conical member, the inner surface of the conical member being coated with an inert non-metallic material to reduce sticking of milk on the surface and facilitating cleaning thereof.

5. The structure as defined in claim 4 together with a jacket on said conical member to receive a coolant, means communicated with the jacket for circulation of the coolant to maintain the conical member at a predetermined temperature.

6. The structure as defined in claim 1 wherein said milk inlet pipe is provided with a plurality of downwardly extending pipes disposed in substantially vertical relation, each of the vertical milk inlet pipes including a horizontally disposed discharge pipe with a slot in the bottom thereof thereby discharging the milk in a plurality of thin films for heat exchange with and absorption of the steam.

7. The structure as defined in claim 6 wherein each of the vertical pipes and each of the horizontal slotted pipes is provided with insulation thereon to prevent heating of the pipes to a temperature higher than the milk.

8. The structure as defined in claim 7 together with a vertically disposed screen panel in alignment with each discharge slot whereby milk discharged from each slot will flow down over the surface of the screen to assure equal heating of each particle of milk discharged into the vessel.

9. A sterilizing apparatus for liquid material comprising a pressure vessel, steam inlet means in said vessel to introduce steam into the vessel with a minimum of turbulence, liquid inlet means above the steam inlet means to discharge liquid into the vessel in a thin vertical film whereby the force of gravity causes downward flow of the thin film of liquid for direct contact with the steam for condensing and absorption of the steam with the steam raising the temperature of the liquid to a sterilizing temperature, vacuum discharge means communicated with the pressure vessel through a liquid seal and a pressure-temperature regulating valve whereby discharge of steam with the liquid is precluded and the liquid and condensed steam will be substantially instantaneously cooled and the condensed steam separated from the liquid.

10. The structure as defined in claim 9 wherein the liquid is preheated milk, said pressure vessel including coolant jacket means receiving circulating coolant to retain the pressure vessel at a predetermined temperature.

11. The structure as defined in claim 10 wherein said steam inlet means includes a manifold disposed peripherally of the vessel, and a plurality of inlet apertures communicating the manifold with the interior of the vessel for reducing the velocity of incoming steam.

12. The structure as defined in claim 11 wherein said milk inlet means includes at least one horizontal tubular member having a discharge slot therein, and insulating means on the tubular member for insulating the milk from the steam prior to direct contact therebetween.

13. The structure as defined in claim 9 wherein said liquid inlet means includes a plurality of horizontally disposed tubular members, each of said tubular members having a longitudinal slot in the bottom thereof for discharging a plurality of thin films of liquid.

14. The structure as defined in claim 13 wherein each of said slots includes a depending strip to form a surface on which the thin film of liquid is formed.

* * * * *